(12) United States Patent
Cruse et al.

(10) Patent No.: US 11,798,207 B2
(45) Date of Patent: Oct. 24, 2023

(54) METHOD AND SYSTEM TO OVERLAY CHARTS

(71) Applicant: JPMorgan Chase Bank, N.A., New York, NY (US)

(72) Inventors: Bradley Howard Cruse, Rowlett, TX (US); Uri Klein, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 43 days.

(21) Appl. No.: 17/341,763

(22) Filed: Jun. 8, 2021

(65) Prior Publication Data

US 2022/0392125 A1    Dec. 8, 2022

(51) Int. Cl.
*G06T 11/20* (2006.01)
*G06F 3/0482* (2013.01)
*G06F 3/04847* (2022.01)

(52) U.S. Cl.
CPC .......... *G06T 11/206* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 6,972,761 B1* | 12/2005 | Cox | ........................ | H04M 3/51 |
| | | | | 715/734 |
| 2004/0164983 A1* | 8/2004 | Khozai | .................... | G09B 5/00 |
| | | | | 345/440 |
| 2012/0271748 A1* | 10/2012 | DiSalvo | ................. | G06Q 40/04 |
| | | | | 705/37 |
| 2016/0042081 A1* | 2/2016 | Baker | ................. | G06F 3/04842 |
| | | | | 715/747 |

\* cited by examiner

*Primary Examiner* — Yi Wang
(74) *Attorney, Agent, or Firm* — Greenblum & Bernstein, P.L.C.

(57) ABSTRACT

A method for facilitating dynamic-transparency chart overlays via a graphical user interface is provided. The method includes displaying, via a client device, the graphical user interface, the graphical user interface including a graphical element to receive an input; receiving, via the graphical user interface, a request relating to an overlay request that corresponds to a visualization of a chart; retrieving data corresponding to the chart; converting the data into a structured data set based on a parameter; generating an overlay chart based on the structured data set, the overlay chart corresponding to a superimposition of the chart; and displaying, via the client device, the overlay chart on the graphical user interface in response to the request.

20 Claims, 5 Drawing Sheets

METHOD AND SYSTEM TO OVERLAY CHARTS

BACKGROUND

1. Field of the Disclosure

This technology generally relates to methods and systems to overlay charts, and more particularly to methods and systems for utilizing dynamic-transparency to overlay charts via a graphical user interface to facilitate visual data comparisons.

2. Background Information

Many business entities rely on large quantities of data to facilitate a wide range of business operations. Often, to identify useful hidden patterns within the data, the data must be visualized by using a graphical representation such as, for example, a chart. Historically, conventional data visualization techniques have resulted in varying degrees of success with respect to facilitating visual correlations between a plurality of charts.

One drawback of using the conventional data visualization techniques is that in many instances, a user must visually translate chart data spatially between the plurality of charts to compare data that appears on separate charts. As a result, visual correlations to identify data patterns across the separate charts are difficult and error prone. Additionally, the separate charts may be conventionally visualized by using several different data scales. The cognitive load on the user's short-term memory due to the spatial visual translation across the different data scales may hinder the identification of necessary data patterns.

Therefore, there is a need for a data visualization process utilizing dynamic-transparency chart overlays that normalizes data and allows the user to control the transparency of the overlay charts to expose details and facilitate visual data correlations.

SUMMARY

The present disclosure, through one or more of its various aspects, embodiments, and/or specific features or sub-components, provides, inter alia, various systems, servers, devices, methods, media, programs, and platforms for utilizing dynamic-transparency to overlay charts via a graphical user interface to facilitate visual data comparisons.

According to an aspect of the present disclosure, a method for facilitating dynamic-transparency chart overlays via a graphical user interface is provided. The method is implemented by at least one processor. The method may include displaying, via a client device, the graphical user interface, the graphical user interface may include at least one graphical element to receive an input; receiving, via the graphical user interface, at least one request, the at least one request may relate to an overlay request that corresponds to a visualization of at least one chart; retrieving data corresponding to the at least one chart; converting the data into a structured data set based on at least one parameter; generating at least one overlay chart based on the structured data set, the at least one overlay chart may correspond to a superimposition of the at least one chart; and displaying, via the client device, the at least one overlay chart on the graphical user interface in response to the at least one request.

In accordance with an exemplary embodiment, the method may further include receiving, via the at least one graphical element, at least one transparency request; dynamically adjusting the overlay chart based on the at least one transparency request; and displaying, via the client device, the at least one adjusted overlay chart on the graphical user interface in response to the at least one transparency request.

In accordance with an exemplary embodiment, the at least one transparency request may include at least one opacity level that corresponds to the at least one chart, the at least one opacity level may relate to a transparency percentage of the at least one chart.

In accordance with an exemplary embodiment, the at least one opacity level may include at least one from among a user predetermined level and an enterprise predetermined level that is based on a business guideline.

In accordance with an exemplary embodiment, the at least one graphical element may include at least one from among a slider control element, a numerical input element, and a list element that includes selectable options.

In accordance with an exemplary embodiment, the slider control element may include at least one from among a continuous slider that enables selection of a particular value along a subjective range and a discrete slider that is adjusted to a specific value by referencing a corresponding value indicator.

In accordance with an exemplary embodiment, the structured data set includes at least one normalized value set that corresponds to at least one from among an X-axis value set and a Y-axis value set of the at least one chart.

In accordance with an exemplary embodiment, the at least one parameter may include at least one from among a predetermined parameter that is set via the graphical user interface and a dynamic parameter that is automatically determined in real-time based on information that is extracted from the at least one chart.

In accordance with an exemplary embodiment, the at least one overlay chart may be generated based on the structured data set and at least one charting library, the at least one charting library may relate to a software library that facilitates the visualization of the data.

In accordance with an exemplary embodiment, the at least one overlay chart may include a multidimensional representation of the at least one chart, the multidimensional representation may include at least one from among a two-dimensional representation and a three-dimensional representation.

According to an aspect of the present disclosure, a computing device configured to implement an execution of a method for facilitating dynamic-transparency chart overlays via a graphical user interface is disclosed. The computing device comprising a processor; a memory; and a communication interface coupled to each of the processor and the memory, wherein the processor may be configured to display, via a client device, the graphical user interface, the graphical user interface may include at least one graphical element to receive an input; receive, via the graphical user interface, at least one request, the at least one request may relating to an overlay request that corresponds to a visualization of at least one chart; retrieve data corresponding to the at least one chart; convert the data into a structured data set based on at least one parameter; generate at least one overlay chart based on the structured data set, the at least one overlay chart may correspond to a superimposition of the at least one chart; and display, via the client device, the at least one overlay chart on the graphical user interface in response to the at least one request.

In accordance with an exemplary embodiment, the processor may be further configured to receive, via the at least one graphical element, at least one transparency request; dynamically adjust the overlay chart based on the at least one transparency request; and display, via the client device, the at least one adjusted overlay chart on the graphical user interface in response to the at least one transparency request.

In accordance with an exemplary embodiment, the at least one transparency request may include at least one opacity level that corresponds to the at least one chart, the at least one opacity level may relate to a transparency percentage of the at least one chart.

In accordance with an exemplary embodiment, the at least one opacity level may include at least one from among a user predetermined level and an enterprise predetermined level that is based on a business guideline.

In accordance with an exemplary embodiment, the at least one graphical element may include at least one from among a slider control element, a numerical input element, and a list element that includes selectable options.

In accordance with an exemplary embodiment, the slider control element may include at least one from among a continuous slider that enables selection of a particular value along a subjective range and a discrete slider that is adjusted to a specific value by referencing a corresponding value indicator.

In accordance with an exemplary embodiment, the structured data set may include at least one normalized value set that corresponds to at least one from among an X-axis value set and a Y-axis value set of the at least one chart.

In accordance with an exemplary embodiment, the at least one parameter may include at least one from among a predetermined parameter that is set via the graphical user interface and a dynamic parameter that is automatically determined in real-time based on information that is extracted from the at least one chart.

In accordance with an exemplary embodiment, the processor may be further configured to generate the at least one overlay chart based on the structured data set and at least one charting library, the at least one charting library may relate to a software library that facilitates the visualization of the data.

In accordance with an exemplary embodiment, the at least one overlay chart may include a multidimensional representation of the at least one chart, the multidimensional representation may include at least one from among a two-dimensional representation and a three-dimensional representation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
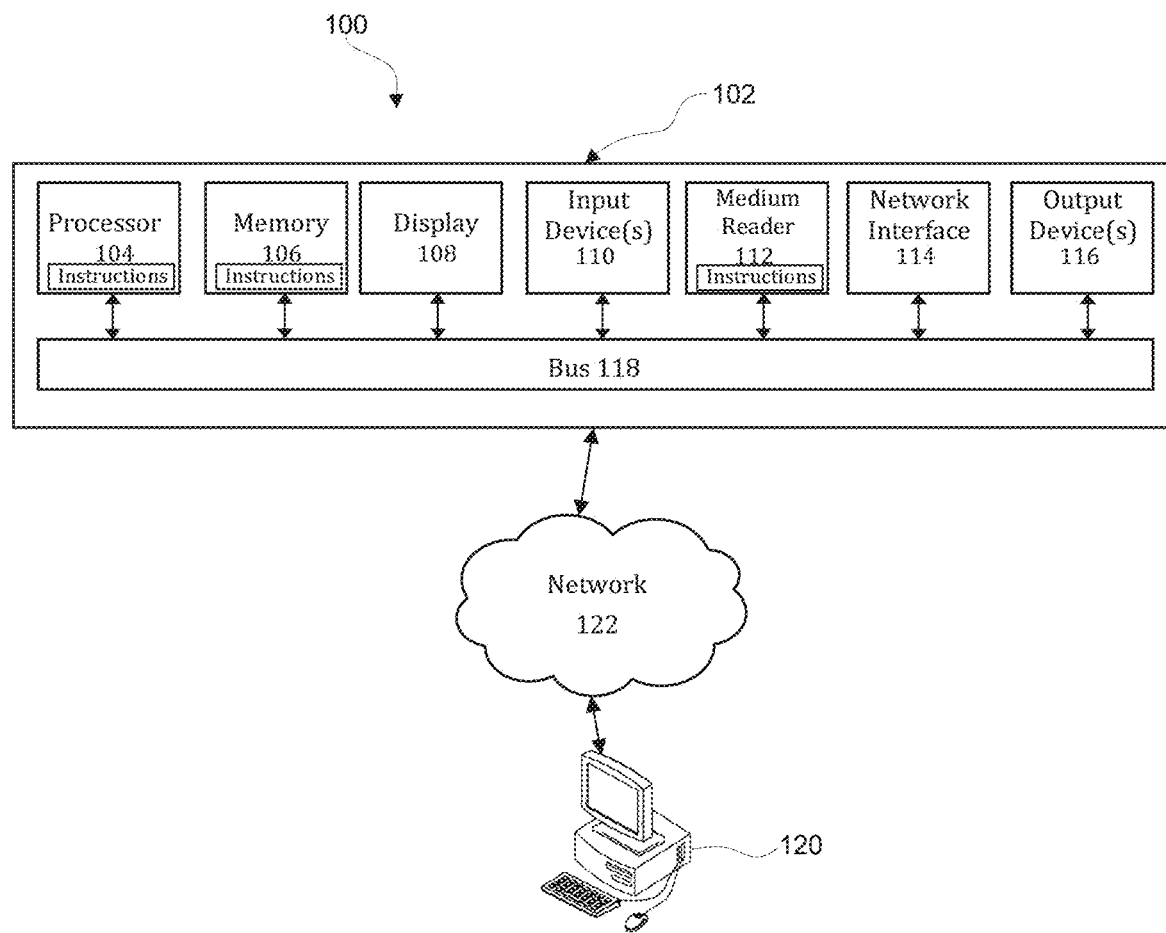
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for utilizing dynamic-transparency to overlay charts via a graphical user interface to facilitate visual data comparisons.

Figure 2:
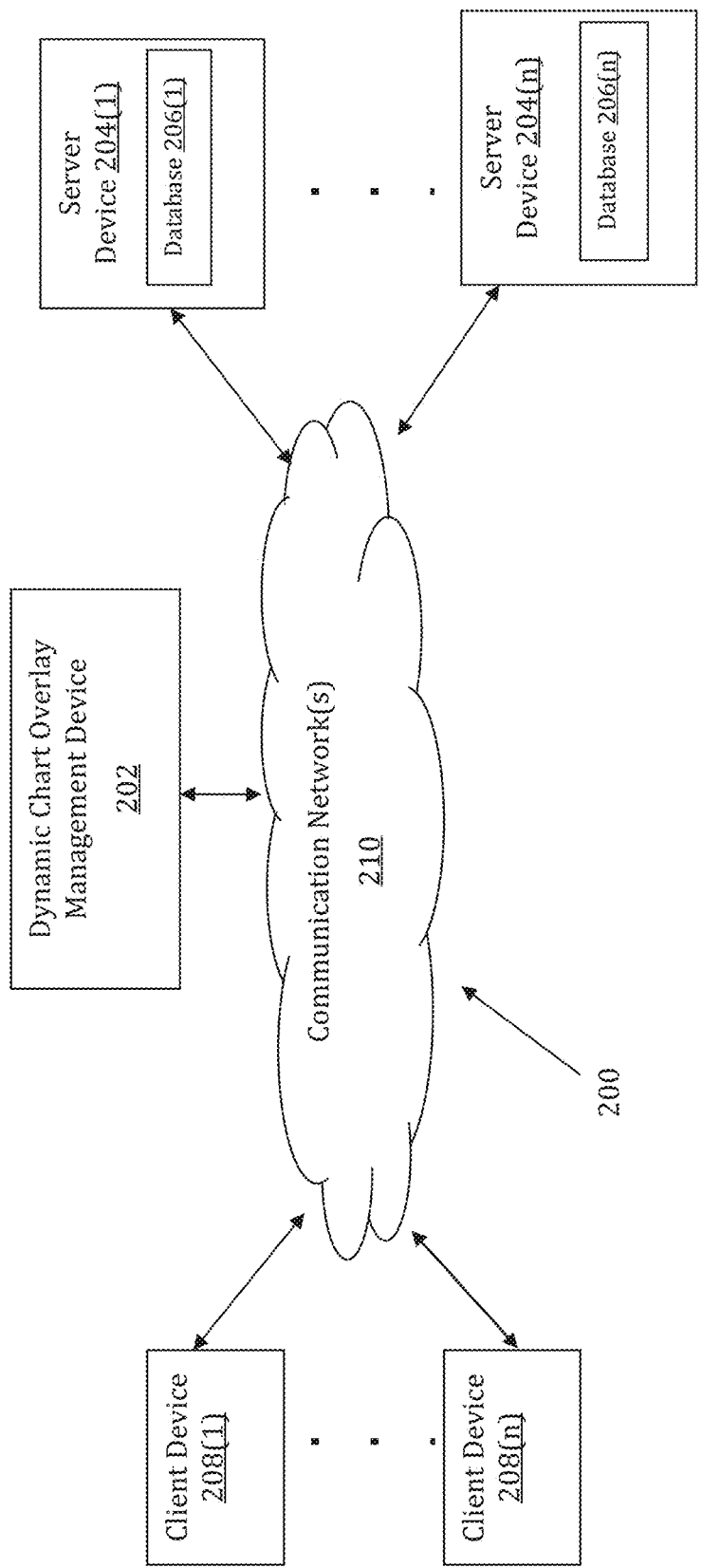
FIG. 2 illustrates an exemplary diagram of a network environment.

Referring to FIG. 2, a schematic of an exemplary network environment 200 for implementing a method for utilizing dynamic-transparency to overlay charts via a graphical user interface to facilitate visual data comparisons is illustrated. In an exemplary embodiment, the method is executable on any networked computer platform, such as, for example, a personal computer (PC).

The method for utilizing dynamic-transparency to overlay charts via a graphical user interface to facilitate visual data comparisons for utilizing dynamic-transparency to overlay charts via a graphical user interface to facilitate visual data comparisons may be implemented by a Dynamic Chart Overlay Management (DCOM) device 202. The DCOM device 202 may be the same or similar to the computer system 102 as described with respect to FIG. 1. The DCOM device 202 may store one or more applications that can include executable instructions that, when executed by the DCOM device 202, cause the DCOM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DCOM device 202 itself, may be located in virtual server(s) running in a cloud-based computing environment rather than being tied to one or more specific physical network computing devices. Also, the application(s) may be running in one or more virtual machines (VMs) executing on the DCOM device 202. Additionally, in one or more embodiments of this technology, virtual machine(s) running on the DCOM device 202 may be managed or supervised by a hypervisor.

In the network environment 200 of FIG. 2, the DCOM device 202 is coupled to a plurality of server devices 204(1)-204(n) that hosts a plurality of databases 206(1)-206(n), and also to a plurality of client devices 208(1)-208(n) via communication network(s) 210. A communication interface of the DCOM device 202, such as the network interface 114 of the computer system 102 of FIG. 1, operatively couples and communicates between the DCOM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DCOM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DCOM devices that efficiently implement a method for utilizing dynamic-transparency to overlay charts via a graphical user interface to facilitate visual data comparisons.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCOM device 202 may be a standalone device or integrated with one or more other devices or apparatuses, such as one or more of the server devices 204(1)-204(n), for example. In one particular example, the DCOM device 202 may include or be hosted by one of the server devices 204(1)-204(n), and other arrangements are also possible. Moreover, one or more of the devices of the DCOM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DCOM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to chart data, charting library data, and overlay data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DCOM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DCOM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DCOM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DCOM device 202, the server devices 204(1)-204(n), or the client devices 208(1)-208(n), for example, may be configured to operate as virtual instances on the same physical machine. In other words, one or more of the DCOM device 202, the server devices 204(1)-204(n), or the client devices 208(1)-208(n) may operate on the same physical device rather than as separate devices communicating through communication network(s) 210. Additionally, there may be more or fewer DCOM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
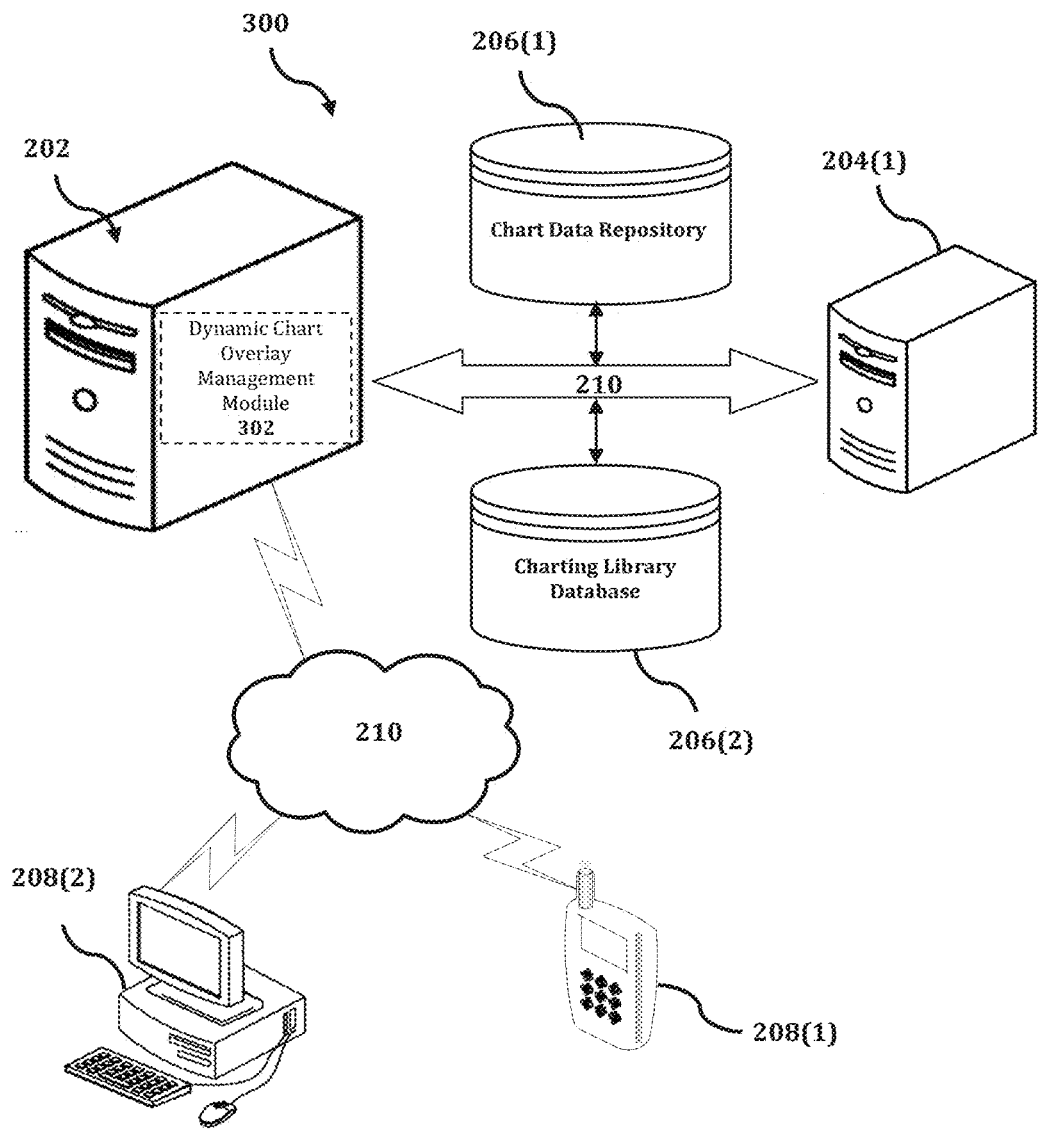
FIG. 3 shows an exemplary system for implementing a method for utilizing dynamic-transparency to overlay charts via a graphical user interface to facilitate visual data comparisons.

The DCOM device 202 is described and shown in FIG. 3 as including a dynamic chart overlay management module 302, although it may include other rules, policies, modules, databases, or applications, for example. As will be described below, the dynamic chart overlay management module 302 is configured to implement a method for utilizing dynamic-transparency to overlay charts via a graphical user interface to facilitate visual data comparisons.

An exemplary process 300 for implementing a mechanism for utilizing dynamic-transparency to overlay charts via a graphical user interface to facilitate visual data comparisons by utilizing the network environment of FIG. 2 is shown as being executed in FIG. 3. Specifically, a first client device 208(1) and a second client device 208(2) are illustrated as being in communication with DCOM device 202. In this regard, the first client device 208(1) and the second client device 208(2) may be "clients" of the DCOM device 202 and are described herein as such. Nevertheless, it is to be known and understood that the first client device 208(1) and/or the second client device 208(2) need not necessarily be "clients" of the DCOM device 202, or any entity described in association therewith herein. Any additional or alternative relationship may exist between either or both of the first client device 208(1) and the second client device 208(2) and the DCOM device 202, or no relationship may exist.

Further, DCOM device 202 is illustrated as being able to access a chart data repository 206(1) and a charting library database 206(2). The dynamic chart overlay management module 302 may be configured to access these databases for implementing a method for utilizing dynamic-transparency to overlay charts via a graphical user interface to facilitate visual data comparisons.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DCOM device 202 via broadband or cellular communication. Of course, these embodiments are merely exemplary and are not limiting or exhaustive.

Upon being started, the dynamic chart overlay management module 302 executes a process for utilizing dynamic-transparency to overlay charts via a graphical user interface to facilitate visual data comparisons. An exemplary process for utilizing dynamic-transparency to overlay charts via a graphical user interface to facilitate visual data comparisons is generally indicated at flowchart 400 in FIG. 4.

Figure 4:
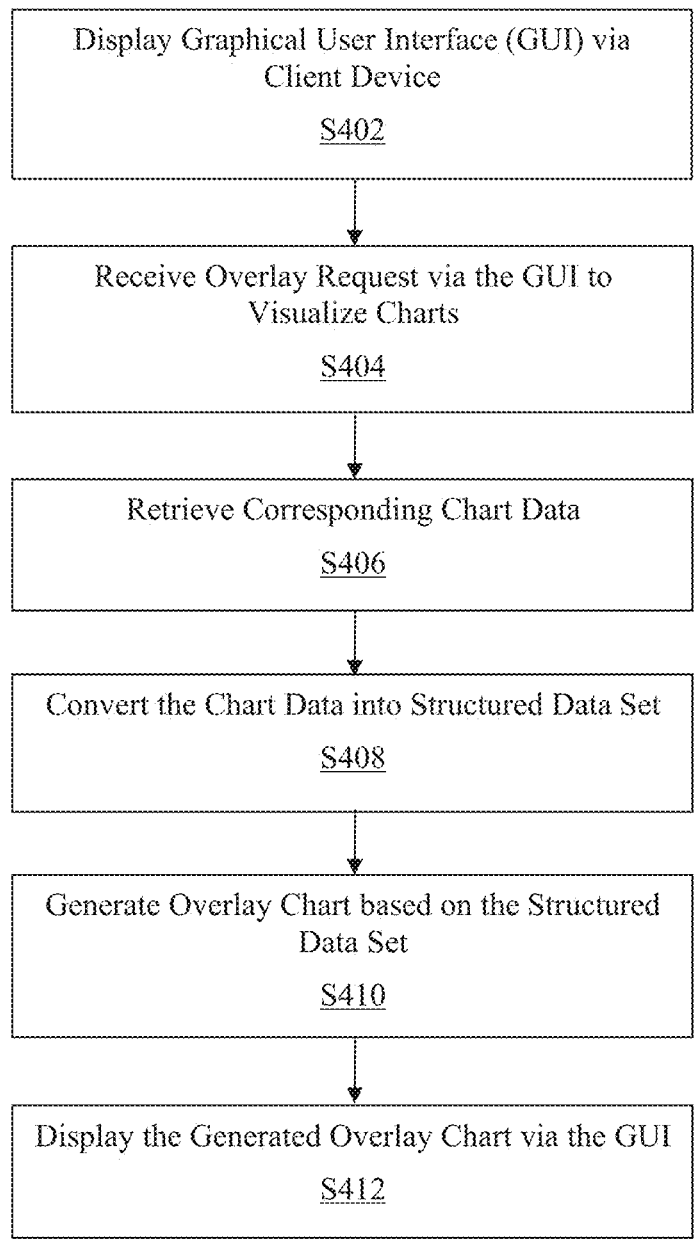
FIG. 4 is a flowchart of an exemplary process for implementing a method for utilizing dynamic-transparency to overlay charts via a graphical user interface to facilitate visual data comparisons.

In the process 400 of FIG. 4, at step S402, a graphical user interface may be displayed via a client device. The graphical user interface may be displayed on a screen of the client device. The client device may include at least one from among a personal computing device and a mobile computing device. In an exemplary embodiment, the graphical user interface may include a graphical element to receive an input. The graphical element may include at least one from among a slider control element, a numerical input element, and a list element that includes selectable options. In another exemplary embodiment, the slider control element may include at least one from among a continuous slider that enables selection of a particular value along a subjective range and a discrete slider that is adjusted to a specific value by referencing a corresponding value indicator.

At step S404, an overlay request that corresponds to a visualization of a chart may be received via the graphical user interface. The overlay request may correspond to a visualization of any number of charts based on a user preference. For example, a user may interact with the graphical user interface to request an overlay visualization for charts A and B. In an exemplary embodiment, the overlay request may include user provided chart data corresponding to the chart to be visualized. For example, the user may include desired chart data together with the overlay request by initiating a data upload via the graphical user interface.

In another exemplary embodiment, the overlay request may include user provided location data corresponding to the chart to be visualized. For example, the user may provide a destination path to desired chart data in a network repository by interacting with the graphical user interface. Then, at step S406, data corresponding to the chart may be retrieved from the network repository by using the user provided location data. In another exemplary embodiment, an application programming interface may be used to retrieve the chart data.

At step S408, the retrieved data may be converted into a structured data set based on a parameter. In an exemplary embodiment, the parameter may include at least one from among a predetermined parameter that is set via the graphical user interface and a dynamic parameter that is automatically determined in real-time based on information that is extracted from the chart. For example, the parameter may include a specific data type to be included in the chart data that is selectable by the user via the graphical user interface. Similarly, for example, the parameter may include a time scale that is automatically determined in real-time based on time information that is extracted from the chart data.

In another exemplary embodiment, the structured data set may include at least one normalized value set that corresponds to at least one from among an X-axis value set and a Y-axis value set that corresponds to the chart. The structured data set may include normalized data values based on a factor such as, for example, a scaling factor to facilitate data visualization. Chart data from a plurality of charts may be normalized based on the scaling factor to enable efficient visual data comparisons of different data scales. For example, a number of detected authorization errors for a given time period may be scaled according to system size so that small systems with few authorization attempts may be efficiently compared to larger systems with many authorization attempts.

At step S410, an overlay chart may be generated based on the structured data set. The overlay chart may correspond to a superimposition of a plurality of charts. In an exemplary embodiment, the overlay chart may be generated based on the structured data set and a charting library. The charting library may relate to a software library that facilitates visualization of the chart data. In another exemplary embodiment, the overlay chart may include a multidimensional representation of a chart. The multidimensional representation may include at least one from among a two-dimensional representation and a three-dimensional representation. As will be appreciated by a person of ordinary skill in the art, the dimensionality of the representation may include any number of dimensions.

At step S412, the generated overlay chart may be displayed on the graphical user interface via the client device in response to the overlay request. In an exemplary embodiment, the overlay chart may provide information to a user based on the user's interaction with graphical elements within the overlay chart. For example, a user may hover a cursor over a data point in the overlay chart to view additional information corresponding to the data point via a popup window. In another exemplary embodiment, the overlay chart may include a tool such as, for example, a dashboard that is used to organize, store, and display important information from multiple data sources into one, easy-to-access graphical interface.

In another exemplary embodiment, the user may interact with user interface elements such as, for example, a list, a checkbox, and a radio button to filter and/or alter the content of the base chart as well as the overlay chart. The user may manipulate the user interface elements to remove data elements from the charts. For example, the user may remove a visualized bar from a bar graph as well as visualized lines from a line graph that corresponds to at least one from among the base chart and the overlay chart.

Similarly, the user may manipulate the user interface elements to add data elements to the charts. For example, the user may add new data elements for visualization as a new bar on a corresponding bar graph as well as a new line on a corresponding line graph. The user may also utilize filter elements of the user interface elements to change the scope of data supplied to the base chart and the overlay chart. For example, the user may filter information such as customer account information from the base chart and the overlay chart by using the filter elements. In another exemplary embodiment, the user may interact with the user interface elements to filter and/or alter the content of the base chart as well as the overlay chart in real-time while the overlay chart is displayed.

In another exemplary embodiment, a transparency request may be received via a graphical element such as, for example, a slider control element on the displayed overlay chart. The transparency request may include an opacity level that corresponds to at least one chart that is visualized by the overlay chart. The opacity level may relate to a transparency percentage of the at least one chart that is visualized by the overlay chart. The transparency percentage may be adjusted for all visual elements such as, for example, supporting visual elements, non-normalized axis elements, axis label elements, chart legend elements, and chart title elements of the at least one chart. For example, the opacity level may be set to a transparency percentage of fifty to allow fifty percent of the visuals of the at least one chart that is visualized by the overlay chart to be visible. In another exemplary embodiment, the opacity level may include at least one from among a user predetermined level and an enterprise predetermined level that is based on a business guideline and set by an administrator.

In another exemplary embodiment, the overlay chart may be dynamically adjusted based on the transparency request. The dynamic adjustment of the overlay chart may be accomplished in real-time based on the received transparency request. For example, a user may interact with a slider control element to indicate a desired opacity level, which is then used to adjust the overlay chart in real-time. Then, the adjusted overlay chart may be displayed on the graphical user interface via the client device in response to the transparency request.

Figure 5:
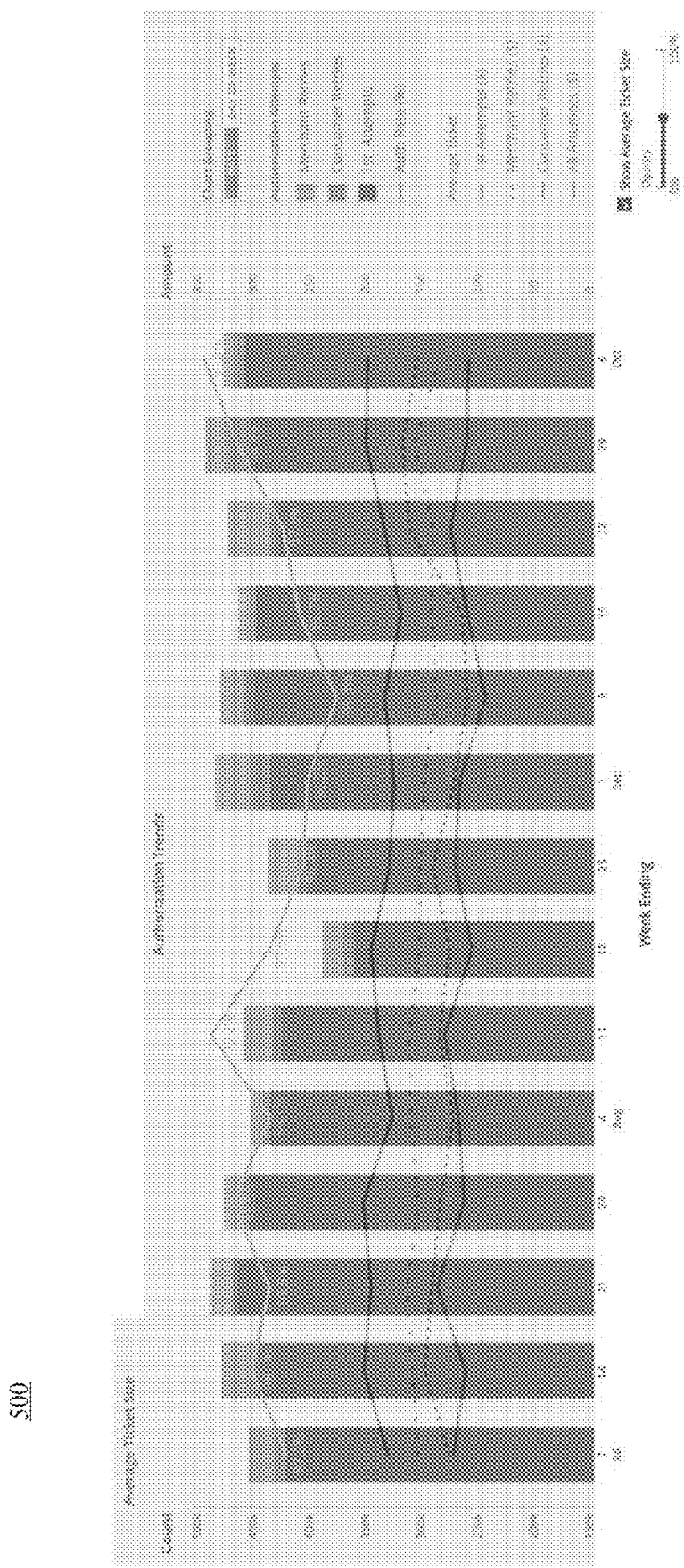
FIG. 5 is a screenshot that illustrates a graphical user interface that is usable for implementing a method for utilizing dynamic-transparency to overlay charts via the graphical user interface to facilitate visual data comparisons, according to an exemplary embodiment.

FIG. 5 is a screenshot 500 that illustrates a graphical user interface that is usable for implementing a method for utilizing dynamic-transparency to overlay charts via the graphical user interface to facilitate visual data comparisons, according to an exemplary embodiment. In FIG. 5, a fifty percent opacity level is set by a user for an overlay chart. The user may set the opacity level from zero percent transparency to one hundred percent transparency based on an interaction with the slider control element on the graphical user interface.

As illustrated in FIG. 5, the overlay chart may be used to visualize data in an "Average Ticket Size" chart and data in an "Authorization Trends" chart. The overlay chart may visualize the "Average Ticket Size" chart and the "Authorization Trends" chart by determining a common X-axis for the two charts consistent with disclosures in the present application. The Y-axis for the two charts may be normalized consistent with disclosures in the present application to facilitate efficient visual comparison.

In an exemplary embodiment, a user may determine the opacity level for each of the two charts separately as well as designate a single chart to adjust the opacity level. The user may utilize a selectable graphical element to designate a particular chart for opacity adjustments. The graphical element may include at least one from among a slider control element, a numerical input element, and a list element that includes selectable options. In another exemplary embodiment, the slider control element may include at least one from among a continuous slider that enables selection of a particular value along a subjective range and a discrete slider that is adjusted to a specific value by referencing a corresponding value indicator. In FIG. 5, the user may interact with the selectable graphical element titled "Show Average Ticket Size" to designate the "Average Ticket Size" chart for opacity adjustments. The user may also utilize selectable graphical elements to organize the overlay chart grouping by date as well as by day of the week.

In another exemplary embodiment, an interactive legend may be used to provide information for various graphical elements in the overlay chart. In FIG. 5, the interactive legend may provide information for "Authorization Attempts" and "Average Ticket." The "Authorization Attempts" interactive legend may include color information for "Merchant Retries," "Consumer Retries," "1st Attempts," and "Auth Rate (%)." The "Average Ticket" interactive legend may include line style information for "1st Attempts ($)," "Merchant Retries ($)," "Consumer Retries ($)," and "All Attempts ($)." The interactive legend may provide additional information via a popup interface in response to a user interaction such as, for example, a hovering of a cursor over the interactive legend.

Accordingly, with this technology, an optimized process for utilizing dynamic-transparency to overlay charts via a graphical user interface to facilitate visual data comparisons is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating dynamic-transparency chart overlays via a graphical user interface, the method being implemented by at least one processor, the method comprising:

displaying, by the at least one processor via a client device, the graphical user interface, the graphical user interface including at least one graphical element to receive an input;

receiving, by the at least one processor via the graphical user interface, at least one request,
        wherein the at least one request relates to an overlay request that corresponds to a visualization of at least one chart; and
        wherein the at least one request includes location data that corresponds to the at least one chart, the location data relating to a destination path to a network repository;

retrieving, by the at least one processor via an application programming interface, data corresponding to the at least one chart by using the location data;

converting, by the at least one processor, the data into a structured data set based on at least one parameter,
        wherein the at least one parameter includes a time scale; and
        wherein the time scale is automatically determined in real-time based on time information that is extracted from the data;

generating, by the at least one processor, at least one overlay chart based on the structured data set,
        wherein the at least one overlay chart corresponds to a superimposition of the at least one chart;

displaying, by the at least one processor via the client device, the at least one overlay chart on the graphical user interface in response to the at least one request;

receiving, by the at least one processor via the client device, a manipulation input that corresponds to a user interface element; and removing, by the at least one processor, the manipulated user interface element and a corresponding at least one data element from the graphical user interface.

2. The method of claim 1, further comprising:

receiving, by the at least one processor via the at least one graphical element, at least one transparency request;

dynamically adjusting, by the at least one processor, the overlay chart based on the at least one transparency request; and displaying, by the at least one processor via the client device, the at least one adjusted overlay chart on the graphical user interface in response to the at least one transparency request.

3. The method of claim 2, wherein the at least one transparency request includes at least one opacity level that corresponds to the at least one chart, the at least one opacity level relating to a transparency percentage of the at least one chart.

4. The method of claim 3, wherein the at least one opacity level includes at least one from among a user predetermined level and an enterprise predetermined level that is based on a business guideline.

5. The method of claim 2, wherein the at least one graphical element includes at least one from among a slider control element, a numerical input element, and a list element that includes selectable options.

6. The method of claim 5, wherein the slider control element includes at least one from among a continuous slider that enables selection of a particular value along a subjective range and a discrete slider that is adjusted to a specific value by referencing a corresponding value indicator.

7. The method of claim 1, wherein the structured data set includes at least one normalized value set that corresponds to at least one from among an X-axis value set and a Y-axis value set of the at least one chart.

8. The method of claim 1, wherein the at least one parameter includes at least one from among a predetermined parameter that is set via the graphical user interface and a dynamic parameter that is automatically determined in real-time based on information that is extracted from the at least one chart.

9. The method of claim 1, wherein the at least one overlay chart is generated based on the structured data set and at least one charting library, the at least one charting library relating to a software library that facilitates the visualization of the data.

10. The method of claim 1, wherein the at least one overlay chart includes a multidimensional representation of the at least one chart, the multidimensional representation including at least one from among a two-dimensional representation and a three-dimensional representation.

11. A computing device configured to implement an execution of a method for facilitating dynamic-transparency chart overlays via a graphical user interface, the computing device comprising:
- a processor;
- a memory; and
- a communication interface coupled to each of the processor and the memory,
- wherein the processor is configured to:
    - display, via a client device, the graphical user interface, the graphical user interface including at least one graphical element to receive an input;
    - receive, via the graphical user interface, at least one request,
        - wherein the at least one request relates to an overlay request that corresponds to a visualization of at least one chart; and
        - wherein the at least one request includes location data that corresponds to the at least one chart, the location data relating to a destination path to a network repository;
    - retrieve, via an application programming interface, data corresponding to the at least one chart by using the location data;
    - convert the data into a structured data set based on at least one parameter,
        - wherein the at least one parameter includes a time scale; and
        - wherein the time scale is automatically determined in real-time based on time information that is extracted from the data;
    - generate at least one overlay chart based on the structured data set,
        - wherein the at least one overlay chart corresponds to a superimposition of the at least one chart;
    - display, via the client device, the at least one overlay chart on the graphical user interface in response to the at least one request;
    - receive, via the client device, a manipulation input that corresponds to a user interface element; and
    - remove the manipulated user interface element and a corresponding at least one data element from the graphical user interface.

12. The computing device of claim 11, wherein the processor is further configured to:
- receive, via the at least one graphical element, at least one transparency request;
- dynamically adjust the overlay chart based on the at least one transparency request; and
- display, via the client device, the at least one adjusted overlay chart on the graphical user interface in response to the at least one transparency request.

13. The computing device of claim 12, wherein the at least one transparency request includes at least one opacity level that corresponds to the at least one chart, the at least one opacity level relating to a transparency percentage of the at least one chart.

14. The computing device of claim 13, wherein the at least one opacity level includes at least one from among a user predetermined level and an enterprise predetermined level that is based on a business guideline.

15. The computing device of claim 12, wherein the at least one graphical element includes at least one from among a slider control element, a numerical input element, and a list element that includes selectable options.

16. The computing device of claim 15, wherein the slider control element includes at least one from among a continuous slider that enables selection of a particular value along a subjective range and a discrete slider that is adjusted to a specific value by referencing a corresponding value indicator.

17. The computing device of claim 11, wherein the structured data set includes at least one normalized value set that corresponds to at least one from among an X-axis value set and a Y-axis value set of the at least one chart.

18. The computing device of claim 11, wherein the at least one parameter includes at least one from among a predetermined parameter that is set via the graphical user interface and a dynamic parameter that is automatically determined in real-time based on information that is extracted from the at least one chart.

19. The computing device of claim 11, wherein the processor is further configured to generate the at least one overlay chart based on the structured data set and at least one charting library, the at least one charting library relating to a software library that facilitates the visualization of the data.

20. The computing device of claim 11, wherein the at least one overlay chart includes a multidimensional representation of the at least one chart, the multidimensional representation including at least one from among a two-dimensional representation and a three-dimensional representation.

* * * * *